(No Model.)

J. W. MORGAN.
LAMP INDICATOR.

No. 581,007.              Patented Apr. 20, 1897.

WITNESSES
Harry L. Ames.
J. C. Tappan.

INVENTOR,
James W. Morgan
by John Wedderburn.
Attorney

UNITED STATES PATENT OFFICE.

JAMES WALTER MORGAN, OF ELKHORN, WEST VIRGINIA.

LAMP-INDICATOR.

SPECIFICATION forming part of Letters Patent No. 581,007, dated April 20, 1897.

Application filed August 26, 1896. Serial No. 603,960. (No model.)

*To all whom it may concern:*

Be it known that I, JAMES WALTER MORGAN, a citizen of the United States, residing at Elkhorn, in the county of McDowell and State of West Virginia, have invented certain new and useful Improvements in Lamp-Indicators; and I do hereby declare the following to be a full, clear, and exact description of the invention, such as will enable others skilled in the art to which it appertains to make and use the same.

This invention has reference to a novel construction in devices for indicating the quantity of liquid in tanks or other receptacles, and especially in metal founts for lamps.

Figure 1:
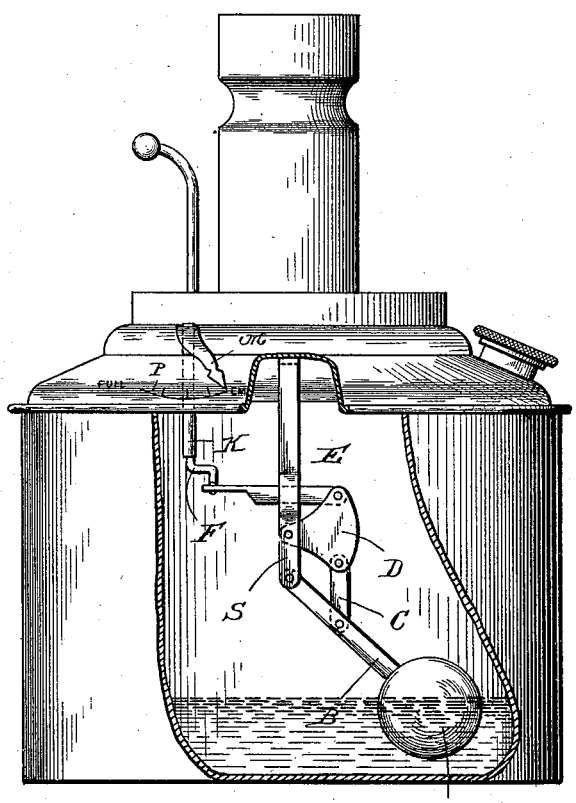
Figure 2:
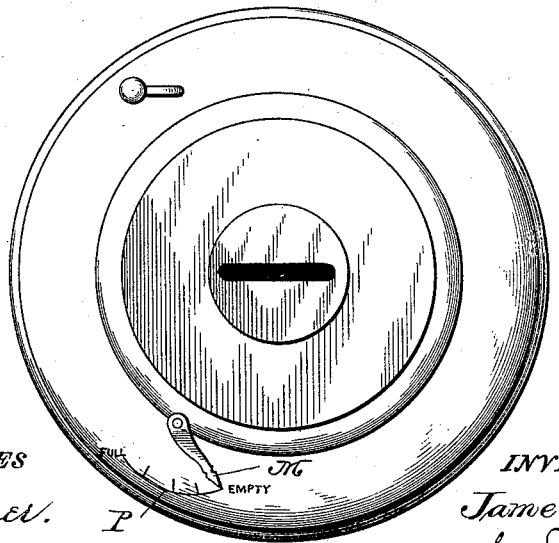

In the drawings, Figure 1 is an elevation of my device as applied to a lamp, a portion of the side of the lamp being broken away so as to clearly show the mechanism. Fig. 2 is a top plan view of a lamp with my device attached thereto.

The object of my invention is to provide means by which it may be readily seen at a glance whether lamps are full or empty and how much oil they contain. I secure this by the following means:

A float A has an arm B, which is pivoted at the outer end to a fixed standard or post S, and this post is secured to the body of the lamp-reservoir. At a point between this pivot and the float is pivoted a link C. Above the point of pivoting the float A has a triangular lever or quadrant D, pivoted to the post S. The link C, which is pivoted to the arm B, is also pivoted to one corner of this triangular lever. To the other or upper corner of this triangular lever is pivoted a link E. This link is made of flat metal and has a quarter-twist. This makes the pivot upon the quadrant a horizontal one and upon the other end a vertical one. A vertical tube K extends through the top of the lamp-reservoir and contains a crank-shaft F. The crank upon this shaft is within the reservoir and is connected with the vertical pivot of the link E. Upon the upper end of the crank-shaft is fixed a pointer or indicator M. Under the path of travel or the end of this indicator is marked a scale P. It will be readily seen from the connection described that an up or down movement of the float A will result in a vibrating movement of the pointer M. One end of the scale indicates that the lamp is empty and the other end that it is full, and any intermediate position of the pointer indicates a corresponding level of the oil. The location of these parts within the lamp will be such that the up-and-down swing or oscillation of the float A will not interfere with either the side of the lamp or the wick-tube.

With lamps fitted with my device it can be told at a glance what their condition is, whether full or empty.

Having thus described my invention, what I claim as new, and desire to secure by Letters Patent, is—

1. An oil-level indicator for lamps, consisting of a float having a horizontal arm and a fixed pivot for the outer end thereof, a quadrant or triangular lever having one fixed pivot, a link connecting the float-arm with one corner of the quadrant, a link connected to the other corner of the quadrant and at its opposite end connected to a crank, a vertical crank-shaft having the above-mentioned crank upon its lower end and its outer end extending outside of the lamp-reservoir, and a pointer attached to the outer end of the said crank-shaft, substantially as described.

2. An oil-level indicator for lamps, consisting of a float having a horizontal arm and a fixed pivot for the outer end thereof, a quadrant or triangular lever having one fixed pivot, a link connecting the float-arm with one corner of the quadrant, a link connected to the other corner of the quadrant and at its opposite end connected to a crank, a vertical crank-shaft having the above-mentioned crank upon its lower end and its outer end extending outside of the lamp-reservoir, and a pointer attached to the outer end of the said crank-shaft, and a scale placed upon the outer portion of the lamp-reservoir under the end of said pointer, substantially as described.

In testimony whereof I have signed this specification in the presence of two subscribing witnesses.

JAMES WALTER MORGAN.

Witnesses:
ALFRED REDDINGTON,
E. H. EVANS.